(12) United States Patent
Mansouri

(10) Patent No.: US 7,131,785 B1
(45) Date of Patent: Nov. 7, 2006

(54) CHEWABLE TOP FOR A WIRING INSTRUMENT

(75) Inventor: Amir A. Mansouri, Woodland Hills, CA (US)

(73) Assignee: Amir A Mansouri, Encino, CA (US)

( * ) Notice: Subject to any disclaimer, the term of this patent is extended or adjusted under 35 U.S.C. 154(b) by 153 days.

(21) Appl. No.: 10/898,915

(22) Filed: Jul. 26, 2004

(51) Int. Cl.
*B43K 29/00* (2006.01)
*B43K 23/12* (2006.01)

(52) U.S. Cl. .................. 401/195; 401/243; 401/247
(58) Field of Classification Search ............... 401/243, 401/247, 195, 52
See application file for complete search history.

(56) References Cited

U.S. PATENT DOCUMENTS

| | | | |
|---|---|---|---|
| 166,934 A | 8/1875 | McGill | |
| 364,916 A | 6/1887 | Goldsmith | |
| 2,312,069 A | 2/1943 | Baumgartner | |
| 2,502,328 A | 3/1950 | Kuhn | |
| 3,615,596 A | 10/1971 | Petti | |
| 4,557,618 A * | 12/1985 | Iwata et al. | 401/34 |
| 5,174,672 A | 12/1992 | Towsend | |
| 5,433,642 A | 7/1995 | Chia | |
| 5,876,136 A | 3/1999 | Tsutsumi et al. | |
| 5,951,184 A | 9/1999 | Sanchez | |
| 6,045,281 A | 4/2000 | Bunn | |
| 6,200,046 B1 | 3/2001 | Rylander | |
| 6,682,245 B1 * | 1/2004 | Saitou | 401/244 |
| 6,932,531 B1 * | 8/2005 | Marschand et al. | 401/202 |

* cited by examiner

*Primary Examiner*—David J. Walczak
(74) *Attorney, Agent, or Firm*—Amir A. Mansouri

(57) ABSTRACT

A chewable writing apparatus comprising a body having a hollow cylindrical shaft, at least one cap selectively connectable to a distal end of the body, and a mechanism for connecting the cap to the body. Upon connection of the cap to the distal end of the body, the cap may be inserted into a mouth of a user for chewing.

6 Claims, 10 Drawing Sheets

CHEWABLE TOP FOR A WIRING INSTRUMENT

BACKGROUND OF THE INVENTION

1. Field of the Invention

The present invention relates generally to attachments for writing instruments and, more specifically, to chewable attachments for writing instruments that are selectively replaceable. The attachments either frictionally fit one or more of the distal ends of a writing instrument or have post means for inserting the chewable attachments into the barrel of the writing instruments. The chewable attachments can be flavored or comprised of whitening elements for the user's teeth. In addition, the chewable attachment may have a protective cover to prevent the chewable attachment from contamination from dirt and bacteria during non-use.

2. Description of the Prior Art

There are other chewable devices designed for writing instruments. Typical of these are U.S. Pat. Nos. 166,934, 364,916, 2,312,069, 2,502,328, 3,615,596, 5,174,672, 5,433, 642, 5,876,136, 5,951,184, 6,045,281, and 6,200,046. While these inventions may be suitable for the purposes for which they were designed, they would not be as suitable for the purposes of the present invention, as hereinafter described.

U.S. Pat. No. 166,934

Inventor: George W. McGill

Issued: Aug. 24, 1875

The invention pertains to an erasive head or tip for pencils, having longitudinal projections or grooves formed in its base, to adapt it to be inserted and retained in a metal holder having a corresponding conformation.

U.S. Pat. No. 364,916

Inventor: Byron B. Goldsmith

Issued: Jun. 14, 1887

Shown is the combination of a pencil stick constructed and arranged to be removed as the lead wears away, having a longitudinal lead containing recess therein, a spring controlled lead-holding device arranged to slide longitudinally in the pencil-stick and locking mechanism coacting with the sliding lead-holding device, whereby the lead may be locked in its projected position against the stress of the spring, substantially as set forth.

U.S. Pat. No. 2,312,069

Inventor: John G. Baumgartner

Issued: Feb. 23, 1943

The invention discloses a protector cap for a pencil device, said cap comprising a cylindrical portion and a conical portion joined at their adjacent ends, with an axially extending wedge-shaped portion projecting inwardly of said cap at the junction of said cylindrical and conical portions, said wedge-shaped portion adapted to frictionally engage a pencil device to retain said cap thereon.

U.S. Pat. No. 2,502,328

Inventor: Paul R. Kuhn

Issued: Mar. 28, 1950

An ornamental device mounted and supported on a pencil having an opaque barrel, comprising a transparent capsule having a shank portion telescoping within the end of said barrel, and an exposed portion extending above the top of the barrel adapted to magnify an object contained therein, the capsule having a central tubular chamber therein, and an unsupported object partially filling said chamber, whereby in one position the object is visible in magnified proportions through the exposed portion of the capsule, while in another position it is within the said shank portion and hidden from view by said opaque barrel.

U.S. Pat. No. 3,615,596

Inventor: Albert F. Petti

Issued: Oct. 26, 1971

A writing accessory comprising an elongated holder member having a hard candy comestible affixed to one end. The other end of the holder member has a socket formation for reception of the free end of a writing implement.

U.S. Pat. No. 5,174,672

Inventor: Marvin S. Towsend

Issued: Dec. 29, 1992

A ball point pen and removable cap combination includes a ball point pen assembly and a removable cap that has a clip/writing-stabilizer portion extending away from the closed end and the open end of the cap. The ball point pen assembly includes a point portion and a barrel portion. The removable cap is capable of sliding longitudinally and fitting by a friction fit onto the barrel portion, on the barrel end opposite the point, when the ball point pen assembly is used for writing, forming a pen-cap combination. In this way, the removable cap can rest upon the skin of the hand between the uppermost joint of the index finger and the uppermost joint of the thumb when the ball point pen assembly is used for writing. Also, when the pen assembly is used for writing, the clip/writing-stabilizer portion extends towards the pen point and is in the vicinity of the pen point, whereby the index finger and the thumb of the user are in contact with the clip/writing-stabilizer portion when the user is writing with the pen-cap combination. The removable cap has a first length from a closed end to an open end. The barrel portion has a second length from one end of the barrel to the other. The first length is at least 50% of the second length, providing a short pen having a relatively long cap, giving the appearance of a baby or midget pen.

U.S. Pat. No. 5,433,642

Inventor: Francis Chia

Issued: Jul. 18, 1995

An improvement in a toy marking device of the type in which a writing tip is carried by a housing, and an oscillating mechanism in the housing is selectively actuated to impart oscillatory motion to the writing tip, the improvement including a visible display coupled with the oscillating mechanism for oscillation in response to actuation of the oscillating mechanism, the visible display including at least one visible element coupled with the visible display such that the visible element is excited by the oscillation of the visible display into movement providing a viewable changing effect during actuation of the oscillating mechanism.

U.S. Pat. No. 5,876,136

Inventor: Toshio Tsutsumi et al.

Issued: Mar. 2, 1999

A writing instrument such as a mechanical pencil is provided with a brush for eliminating static electricity. The instrument is composed of a barrel and a barrel cap attached to the barrel. A base portion of the brush is fixedly received in a cylindrical protector arranged within the barrel cap. A writing element operating mechanism is arranged to operably hold a writing element such as a lead so that the writing element can be selectively extended from and retracted into the barrel. A brush operating mechanism is also arranged to hold the protector movably along a central axis of the barrel cap so that the brush can be selectively extended from and retracted into the barrel cap. A cylindrical member may preferably be fixedly secured in a rear end of the barrel cap to guide the brush. One of the operating mechanisms can be actuated by causing one of the barrel and the barrel cap to move relative to the other in an axial direction, and the other operating mechanism can be actuated by causing one of the barrel and the barrel cap to turn relative to the other.

U.S. Pat. No. 5,951,184

Inventor: Omar A. Sanchez

Issued: Sep. 14, 1999

A new candy attachment for a writing instrument for allowing a user to removably mount candy to an end of a writing instrument. The inventive device includes an edible candy member having a cylindrical lower end which is frictionally inserted into the cylindrical upper hollow interior of a connector sleeve. The lower section hollow interior is shaped to frictionally hold an end of a writing instrument therein.

U.S. Pat. No. 6,045,281

Inventor: Renae B. Bunn

Issued: Apr. 4, 2000

An anti-theft attachment for a writing implement, such as a pencil or pen. The preferred anti-theft attachment comprises an adhesively attached, premanufactured front and back surface disposed on the tip or side of the writing implement. Alternative embodiments comprise flexible and rigid loops. Indicia may be provided to all embodiments.

U.S. Pat. No. 6,200,046

Inventor: Kurt M. Bylander

Issued: Mar. 13, 2001

A chewable writing instrument. A chewable sheath attachable to a writing instrument. A chewable sheath containing writing means having a writing end and a non-writing, chewable end. The chewable sheath or combination is suitable for placement into the human oral cavity and adapted for the chewing action of the teeth, lips, gum, and tongue. A chewable sheath protects the mouth, teach, tongue, and tissue of the chewer. A chewable sheath protects the chewer. A chewable sheath protects the chewer's clothing. A chewable sheath or combination with dental hygiene conformations provides a supplement to daily dental hygiene care. A chewable sheath or combination flavored with flavoring aromatic and tasteful to the chewer enhances chewing pleasure. A chewable sheath or combination flavored with flavoring bitter and unattractively flavored to the chewer aids in breaking bad chewing habits. A chewable sheath or combination flavored with flavoring nicotine or nicotine tasting substances provides oral satisfaction and aids in breaking the smoking and tobacco chewing habits.

SUMMARY OF THE PRESENT INVENTION

The present invention relates generally to attachments for writing instruments and, more specifically, to chewable attachments for writing instruments that are selectively replaceable. The attachments either frictionally fit one or more of the distal ends of a writing instrument or have post means for inserting the chewable attachments into the barrel of the writing instruments. The chewable attachments can be flavored or comprised of whitening elements for the user's teeth. In addition, the chewable attachment may have a protective cover to prevent the chewable attachment from contamination from dirt and bacteria during non-use.

A primary object of the present invention is to provide a chewable writing instrument that overcomes the shortcomings of the prior art.

Another, secondary object of the present invention is to provide a chewable writing instrument that is disposable.

Another object of the present invention is to provide a chewable writing instrument that has flavoring added to the chewable element.

Yet another object of the present invention is to provide a chewable writing instrument having a whitening agent contained therein.

Still yet another object of the present invention is to provide a chewable writing instrument having a cover to protect the chewable element from contamination.

A further object of the present invention is to provide a chewable writing instrument that may be selectively discarded and replaced.

Yet a further object of the present invention is to provide chewable writing instrument that will protect said writing instruments.

Additional objects of the present invention will appear as the description proceeds.

Statistics show that half the world population chews on pens, markers and pencils. The act of chewing pens or pencils is usually linked to stress and/or anxiety. The habit can cause problems to the teeth and mouth, not to mention the introduction of germs and bacteria that are harmful to the chewer. The present invention overcomes the shortcomings of the prior art by providing a safe new way to reduce the risks involved when chewing pencils or pens by providing a chewable element that is removably attachable to a pen or pencil and having an additional protective end cap for sanitary protection. The attachments either frictionally fit one or more of the distal ends of a writing instrument or have post means for inserting the chewable attachments into the barrel of the writing instruments. The chewable attachments can be flavored or comprised of whitening elements for the user's teeth. Additionally, the chewable attachment may have a protective cover to prevent the chewable attachment from contamination from dirt and bacteria during non-use.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
FIG. 1 is an illustrative view of prior art.

Turning now descriptively to the drawings, in which similar reference characters denote similar elements throughout the several views, the Figures illustrate the chewable writing instrument of the present invention. With regard to the reference numerals used, the following numbering is used throughout the various drawing Figures.

2 chewable writing instrument of the present invention
2 writing instrument body
6 protective tip cap
8 protective end cap
10 chewable tip cap
12 chewable end cap
14 friction fit insert
16 pin insert
18 slip-on insert

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views. FIGS. 1 through 10 illustrate the chewable writing instrument of the present invention indicated generally by the numeral 2.

FIG. 1 is an illustrative view of prior art. Shown is a man chewing on a pen or pencil while working. The act of chewing pens or pencils is usually linked to stress and/or anxiety. The habit can cause problems to the teeth and mouth, not to mention the introduction of germs and bacteria that are harmful to the chewer.

Figure 2:
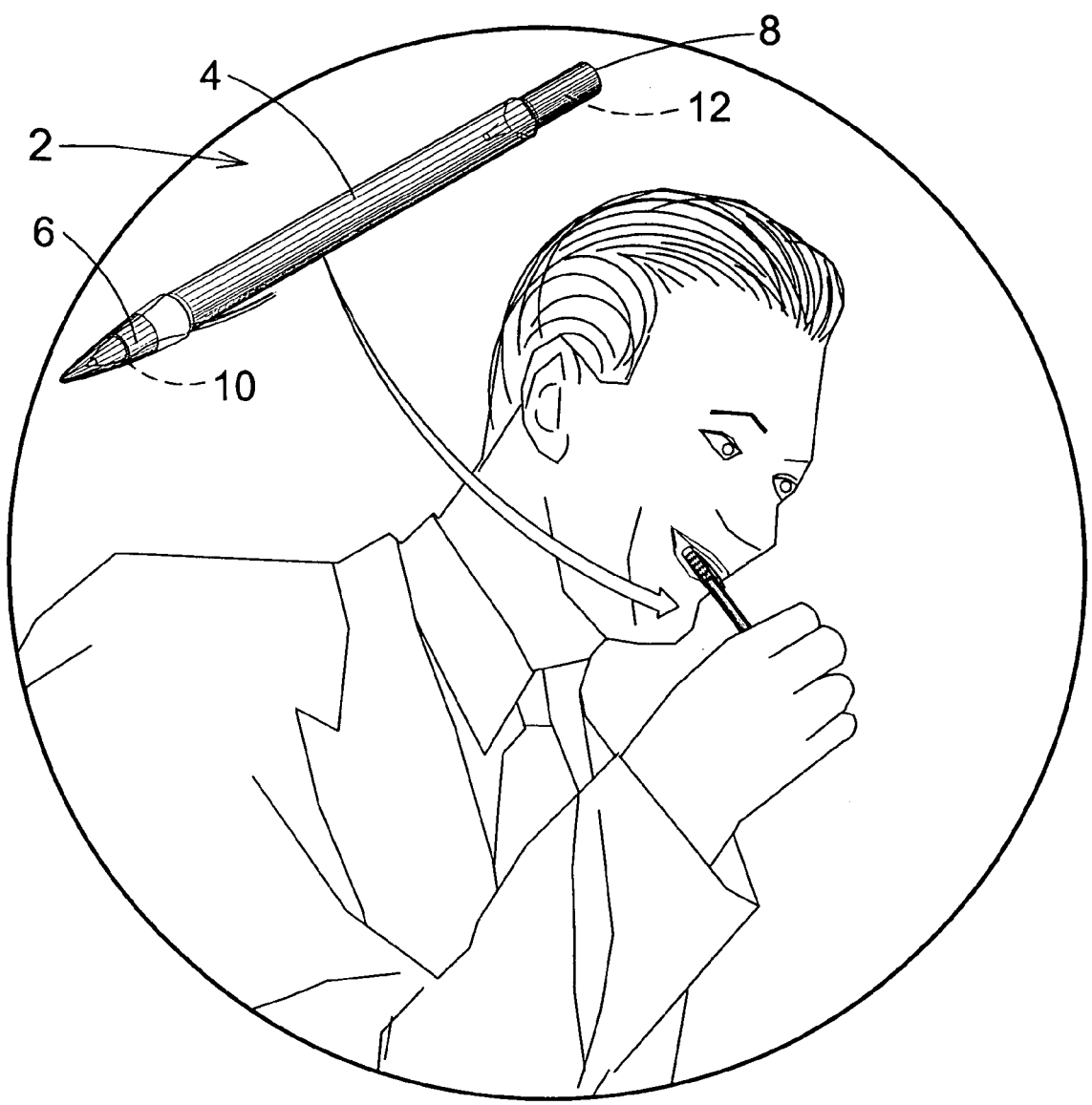
FIG. 2 is an illustrative view of the chewable writing instrument of the present invention in use.

FIG. 2 is an illustrative view of the present invention. The user may chew either end of the chewable writing instrument 2. The chewable writing instrument 2 includes a writing instrument body 4, which is equivalent to the body of a conventional pen or pencil. The writing instrument body 4 is preferably cylindrical in shape and has a circular opening at each end thereof. A writing element is positioned within a first circular opening and an end cap is positioned at the end opposite the writing element. The chewable writing instrument 2 also includes a chewable tip cap 10 and chewable end cap 12. Preferably, the chewable tip cap 10 and the chewable end cap 12 are protected by a protective tip cap 6 and protective end cap 8, respectively. The protective tip cap 6 is slideably positioned over the chewable tip cap 10 and the chewable tip cap 10 is slideably positioned over the writing element of the writing instrument body 4. The protective end cap 8 is slideably positioned over the chewable end cap 12 and the chewable end cap 12 is connected to the end opposite the writing element of the writing instrument body 4. The chewable end cap 12 may be attached by a number of attachment means, as described hereinafter with specific reference to FIGS. 4–9.

Figure 3:
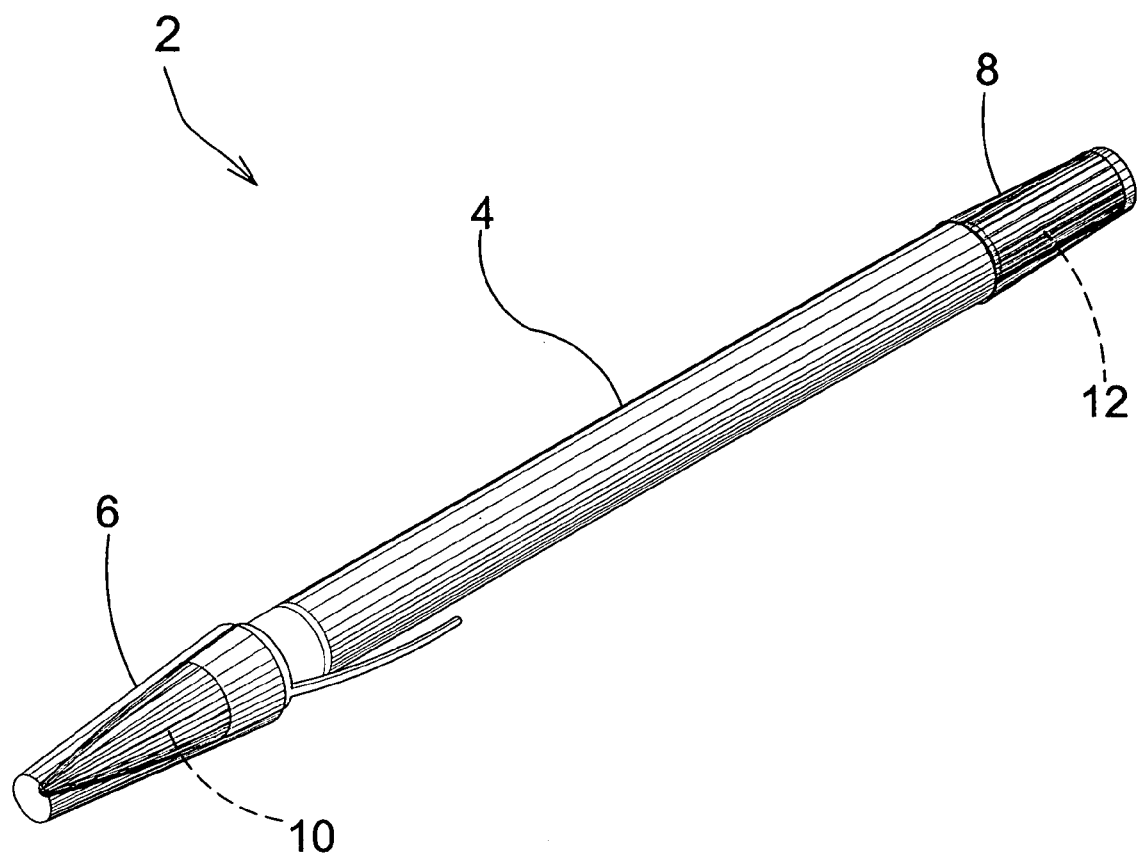
FIG. 3 is a perspective view of the chewable writing instrument of the present invention.

FIG. 3 is a perspective view of the present invention. The chewable writing instrument 2 includes a writing instrument body 4, which is equivalent to the body of a conventional pen or pencil. The writing instrument body 4 is preferably cylindrical in shape and has a circular opening at each end thereof. A writing element is positioned within a first circular opening and an end cap is positioned at the end opposite the writing element. The chewable writing instrument 2 also includes a chewable tip cap 10 and chewable end cap 12. Preferably, the chewable tip cap 10 and the chewable end cap 12 are protected by a protective tip cap 6 and protective end cap 8, respectively. The protective tip cap 6 is slideably positioned over the chewable tip cap 10 and the chewable tip cap 10 is slideably positioned over the writing element of the writing instrument body 4. The protective end cap 8 is slideably positioned over the chewable end cap 12 and the chewable end cap 12 is connected to the end opposite the writing element of the writing instrument body 4. The chewable end cap 12 may be attached by a number of attachment means, as described hereinafter with specific reference to FIGS. 4–9. FIG. 3 shows the chewable writing instrument of the present invention in fully assembled form.

Figure 4:
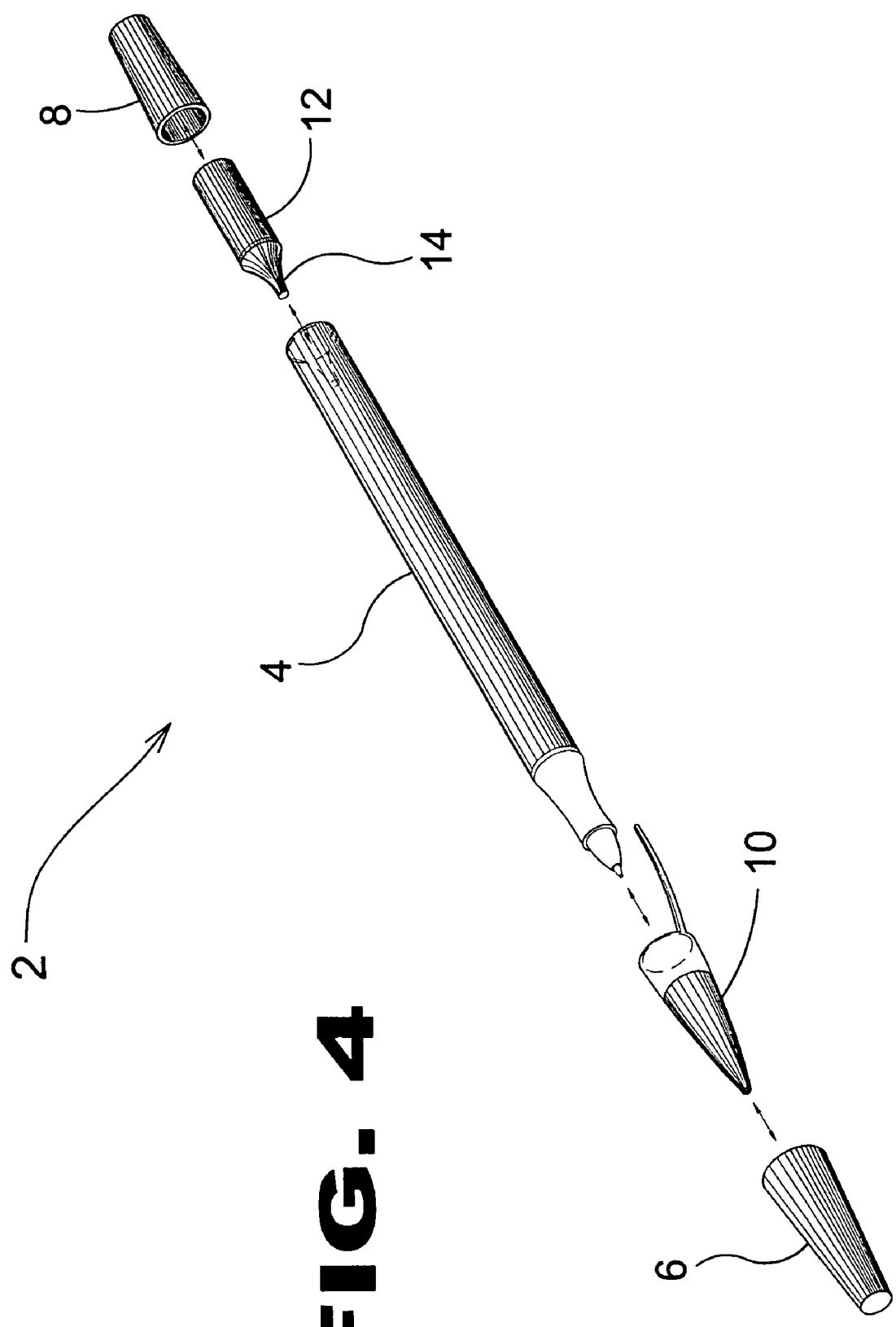
FIG. 4 is an exploded view of the chewable writing instrument of the present invention.

FIG. 4 is an exploded view of the present invention. The chewable writing instrument 2 includes a writing instrument body 4, which is equivalent to the body of a conventional pen or pencil. The writing instrument body 4 is preferably cylindrical in shape and has a circular opening at each end thereof. A writing element is positioned within a first circular opening and an end cap is positioned at the end opposite the writing element. The chewable writing instrument 2 also includes a chewable tip cap 10 and chewable end cap 12. Preferably, the chewable tip cap 10 and the chewable end cap 12 are protected by a protective tip cap 6 and protective end cap 8, respectively. The protective tip cap 6 is slideably positioned over the chewable tip cap 10 and the chewable tip cap 10 is slideably positioned over the writing element of the writing instrument body 4. The protective end cap 8 is slideably positioned over the chewable end cap 12 and the chewable end cap 12 is connected to the end opposite the writing element of the writing instrument body 4. The chewable end cap 12 is connected to the end of the writing instrument body 4 by means of a friction fit insert 14 positioned within the circular opening opposite the writing element. The chewable end cap 12 is retained by the friction generated between the exterior of the friction fit insert 14 and the interior of the writing instrument body 4. The protective end cap 8 is slideably positioned over the chewable end cap 12 when the chewable end cap 12 is not in use.

Figure 5:
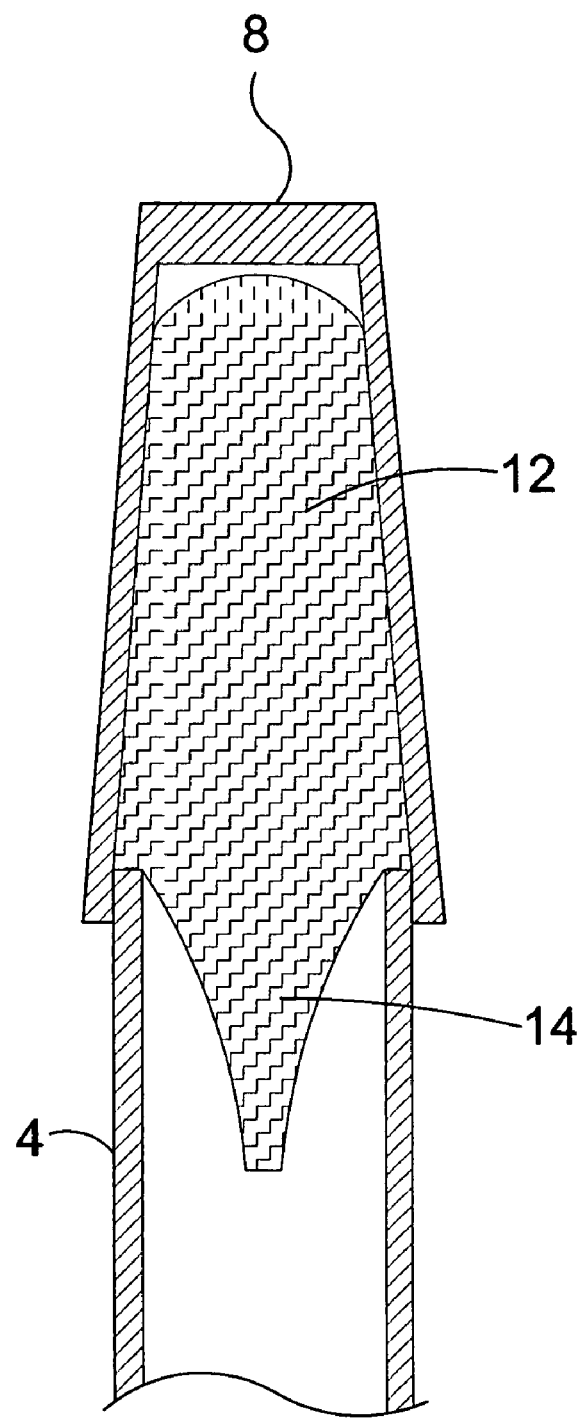
FIG. 5 is a sectional view of the chewable writing instrument of the present invention.

FIG. 5 is a sectional view of the chewable end cap of the present invention. The chewable end cap 12 is connected to the end of the writing instrument body 4 by means of a friction fit insert 14 positioned within the circular opening opposite the writing element. The chewable end cap 12 is retained by the friction generated between the exterior of the friction fit insert 14 and the interior of the writing instrument body 4. The protective end cap 8 is slideably positioned over the chewable end cap 12 when the chewable end cap 12 is not in use. As shown in FIG. 5, the protective end cap 8 fits snugly over the chewable end cap 12 to ensure that the chewable end cap 12 is protected from germs and unsanitary conditions.

Figure 6:
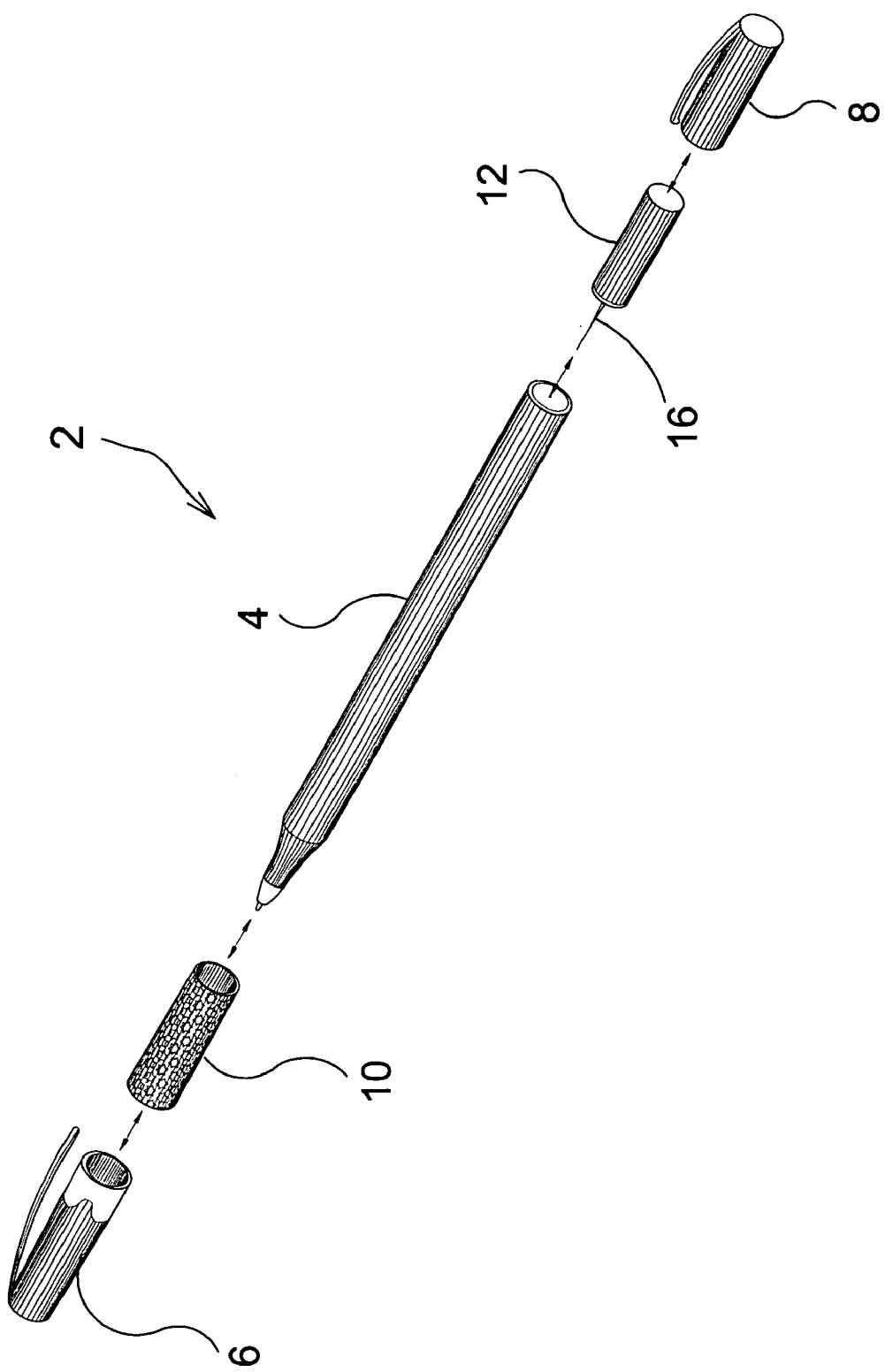
FIG. 6 is an exploded view of a second variation of the chewable writing instrument of the present invention.

FIG. 6 is an exploded view of a second variation of the present invention. The chewable writing instrument 2 includes a writing instrument body 4, which is equivalent to the body of a conventional pen or pencil. The writing instrument body 4 is preferably cylindrical in shape and has a circular opening at each end thereof. A writing element is positioned within a first circular opening and an end cap is positioned at the end opposite the writing element. The chewable writing instrument 2 also includes a chewable tip cap 10 and chewable end cap 12. Preferably, the chewable tip cap 10 and the chewable end cap 12 are protected by a protective tip cap 6 and protective end cap 8, respectively. The protective tip cap 6 is slideably positioned over the chewable tip cap 10 and the chewable tip cap 10 is slideably positioned over the writing element of the writing instrument body 4. The protective end cap 8 is slideably positioned over the chewable end cap 12 and the chewable end cap 12 is connected to the end opposite the writing element of the writing instrument body 4. The chewable end cap 12 is attached to the end of the writing instrument body 4 by means of a pin insert 16. The chewable end cap 12 is retained by the pin insert 16 piercing the solid end cap of the writing instrument body 4. The protective end cap 8 is slideably positioned over the chewable end cap 12 when the chewable end cap 12 is not in use.

Figure 7:
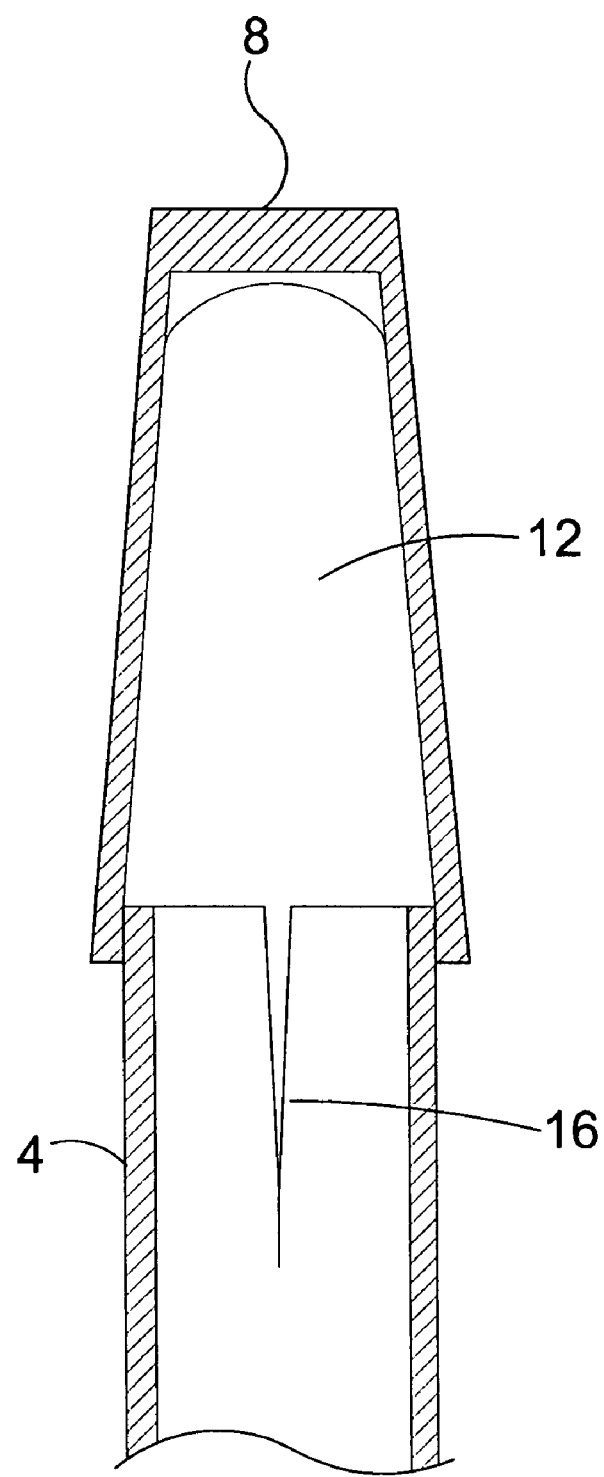
FIG. 7 is a sectional view of a second variation of the chewable writing instrument of the present invention.

FIG. 7 is a sectional view of a second variation of the chewable end cap of the present invention. The chewable end cap 12 is attached to the end of the writing instrument body 4 by means of a pin insert 16. The chewable end cap 12 is retained by the pin insert 16 piercing the solid end cap of the writing instrument body 4. The protective end cap 8 is slideably positioned over the chewable end cap 12 when the chewable end cap 12 is not in use. As shown in FIG. 7, the protective end cap 8 fits snugly over the chewable end cap 12 to ensure that the chewable end cap 12 is protected from germs and unsanitary conditions.

Figure 8:
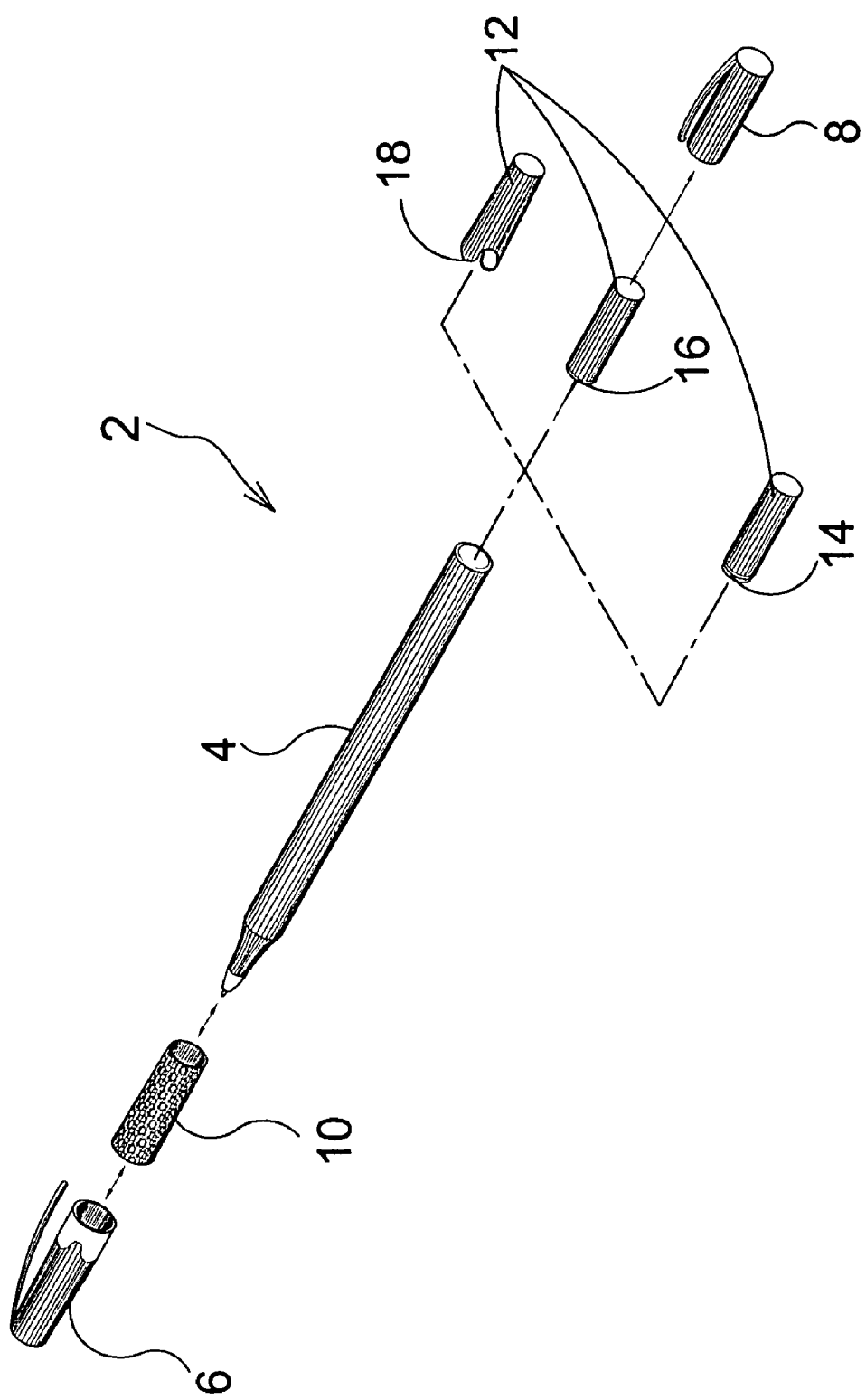
FIG. 8 is an exploded view of variations the chewable writing instrument of the present invention.

FIG. 8 is an exploded view of several variations the present invention. The chewable writing instrument 2 includes a writing instrument body 4, which is equivalent to the body of a conventional pen or pencil. The writing instrument body 4 is preferably cylindrical in shape and has a circular opening at each end thereof. A writing element is positioned within a first circular opening and an end cap is positioned at the end opposite the writing element. The chewable writing instrument 2 also includes a chewable tip cap 10 and chewable end cap 12. Preferably, the chewable tip cap 10 and the chewable end cap 12 are protected by a protective tip cap 6 and protective end cap 8, respectively. The protective tip cap 6 is slideably positioned over the chewable tip cap 10 and the chewable tip cap 10 is slideably positioned over the writing element of the writing instrument body 4. The protective end cap 8 is slideably positioned over the chewable end cap 12 and the chewable end cap 12 is connected to the end opposite the writing element of the writing instrument body 4. The chewable end cap 12 is connected to the end of the writing instrument body 4 by means of at least one of a friction fit insert 14, pin insert 16, and a slip-on element 18. The chewable end cap 12 is retained by the friction of the exterior of the friction fit insert 14 against the interior of the hollow end of the writing instrument body 4. The chewable end cap 12 is alternately retained by the pin insert 14 piercing the solid end cap of the writing instrument body 4. Furthermore, the chewable end cap 12 is slideably positioned over the end cap of the writing instrument body 4 by means of a slip-on element 18. The slip-on element 18 may be selectively attached or connected to the chewable end cap 12. The protective end cap 8 is slideably positioned over the chewable end cap 12 when the chewable end cap 12 is not in use.

Figure 9:
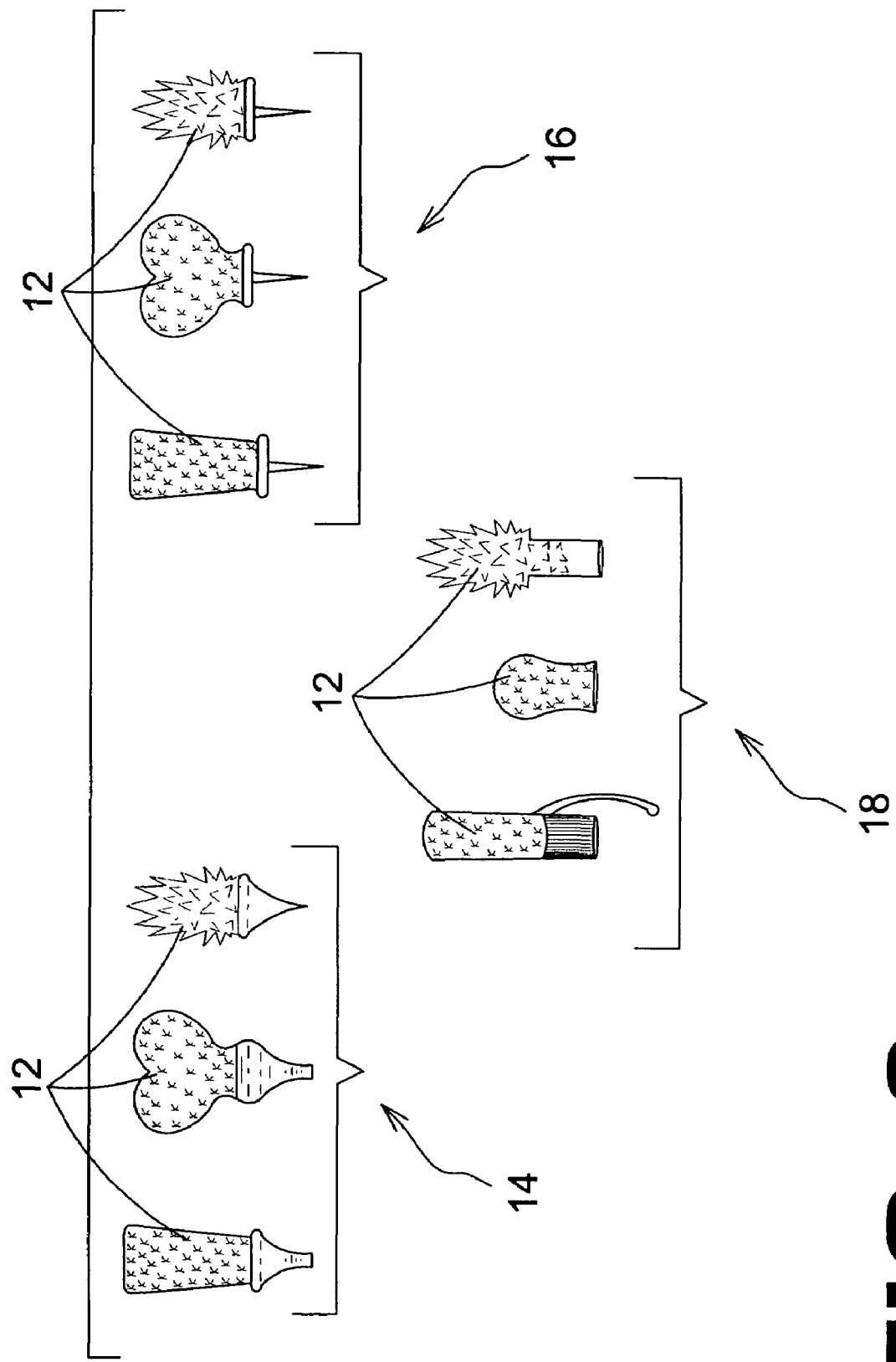
FIG. 9 is an orthographic view of several variations the chewable end caps of the present invention.

FIG. 9 is an orthographic view of several variations of the chewable end cap of the present invention. The chewable end cap 12 is attached to the end of the writing instrument body 4 by means of a friction fit insert 14, pin insert 16, or a slip-on element 18. The shape of the chewable end cap 12 may vary, including, but not limited to, flat, rectangular, heart-shaped, cylindrical, conical, star-shaped, or with random conical projections. The chewable end cap may also include a variety of colors, flavored elements, textures, and ingredients. Such flavors include peppermint, spearmint, cinnamon, bubble gum, and fruit flavors. Such ingredients include teeth whitening/cleaning elements, fluoride, peroxide, and breath-freshener.

Figure 10:
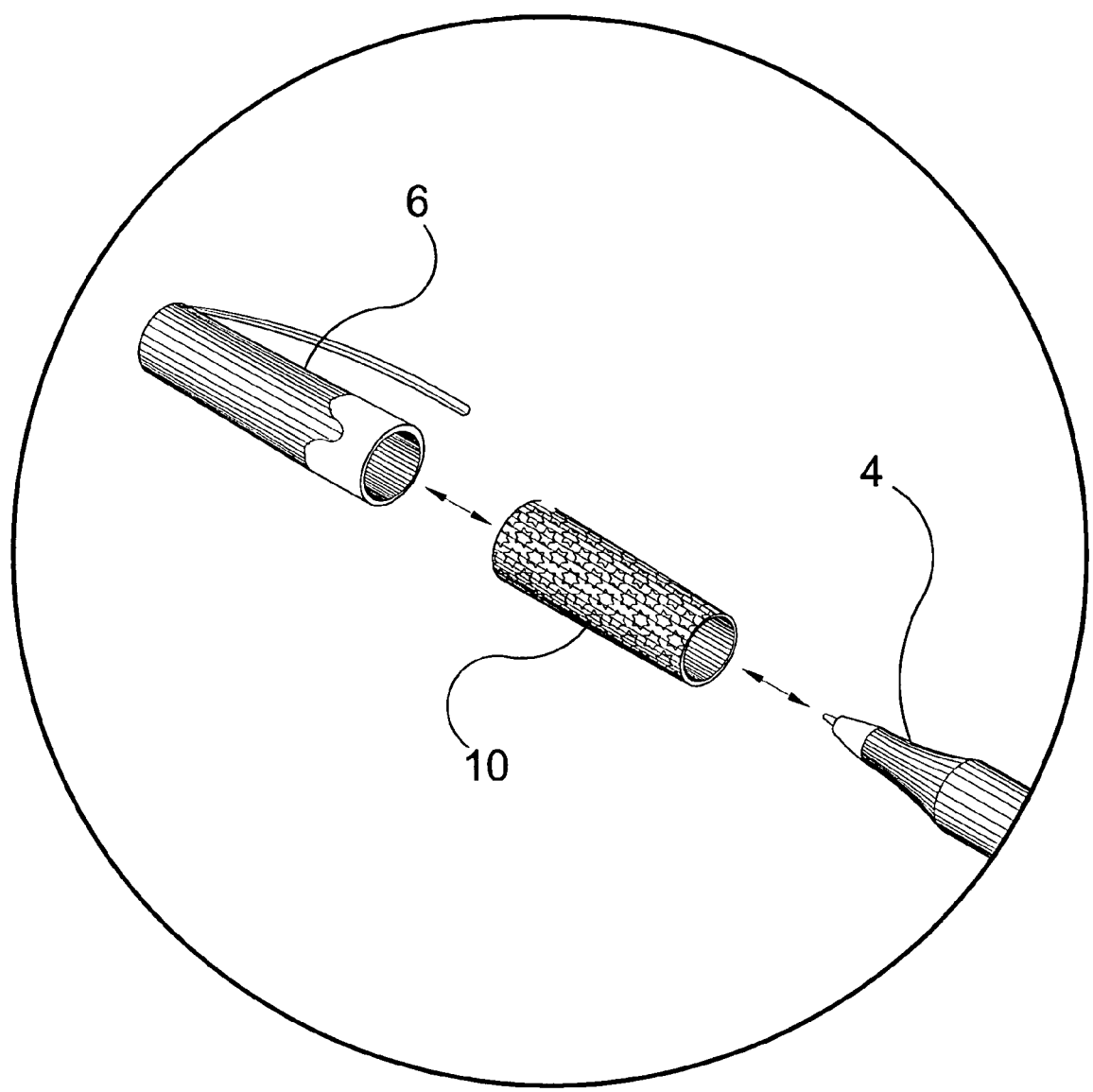
FIG. 10 is a detailed view of a chewable end cap of the present invention.

FIG. 10 is a detailed view of the chewable tip cap of the present invention. The protective tip cap 6 is slideably positioned over the chewable tip cap 10 and the chewable tip cap 10 is slideably positioned over the tip, or writing element, of the writing instrument body 4. The writing instrument body 4 may include a pen or a pencil. As shown in FIG. 10, the protective tip cap 6 fits snugly over the chewable tip cap 10 to ensure that the chewable tip cap 10 is protected from germs and unsanitary conditions.

What is claimed and desired by Letters Patent of the United States is:

1. A chewable writing apparatus comprising:
   a body having a cylindrical shaft with an opening at an end thereof and an opposite end;
   a writing element positioned in said opening;
   a chewable tip cap slidably positioned over said writing element;
   a chewable end cap connected at said opposite end of said body;
   a protective tip cap slidably positioned over said chewable tip cap; and
   a protective end cap slidably positioned over said chewable end cap wherein said chewable tip cap and said chewable end cap are selectively insertable into a mouth of a user for chewing thereof and wherein each chewable cap includes at least one of a flavored element, fluoride, peroxide and a breath-freshener.

2. The apparatus as recited in claim 1, wherein said chewable end cap is connected by a friction fit insert which is positioned within said body at said distal end.

3. The apparatus as recited in claim 1, wherein said chewable end cap is connected by is a pin insert which pierces a solid end of said body.

4. The apparatus as recited in claim 1, wherein said chewable end cap is connected by is a slide-on insert which is slideably connected at said distal end of said body.

5. The apparatus as recited in claim 1, wherein at least one cap includes a teeth whitening element.

6. The apparatus as recited in claim 1, wherein at least one cap includes a teeth cleaning element.

* * * * *

UNITED STATES PATENT AND TRADEMARK OFFICE
CERTIFICATE OF CORRECTION

PATENT NO. : 7,131,785 B1  Page 1 of 1
APPLICATION NO. : 10/898915
DATED : November 7, 2006
INVENTOR(S) : Amir A. Mansouri It is certified that error appears in the above-identified patent and that said Letters Patent is hereby corrected as shown below:

On the title page, item [54] and column 1, line 1 change "Wiring" to --Writing--.

Signed and Sealed this

Twenty-second Day of July, 2008

JON W. DUDAS
*Director of the United States Patent and Trademark Office*